US006903718B2

(12) United States Patent
Son

(10) Patent No.: US 6,903,718 B2
(45) Date of Patent: Jun. 7, 2005

(54) METHOD OF DRIVING LIQUID CRYSTAL DISPLAY

(75) Inventor: Hyeon Ho Son, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 7 days.

(21) Appl. No.: 10/013,350

(22) Filed: Dec. 13, 2001

(65) Prior Publication Data

US 2002/0075224 A1 Jun. 20, 2002

(30) Foreign Application Priority Data

Dec. 15, 2000 (KR) ........................................ 2000-76845

(51) Int. Cl.$^{7}$ ........................ G09G 3/36; G02F 1/1333; H04N 3/14

(52) U.S. Cl. ......................... 345/102; 345/87; 348/273; 349/80; 349/106

(58) Field of Search ............................... 345/87–89, 99, 345/32, 102; 348/273, 279, 290, 743; 349/80, 106

(56) References Cited

U.S. PATENT DOCUMENTS 5,122,791 A * 6/1992 Gibbons et al. ............ 345/102
5,128,782 A * 7/1992 Wood .......................... 349/61
5,580,142 A * 12/1996 Kurematsu et al. ........... 353/31
6,115,016 A * 9/2000 Yoshihara et al. ............ 345/88
6,147,720 A * 11/2000 Guerinot ...................... 348/744
6,323,963 B1 * 11/2001 Takahashi .................... 358/474
6,573,882 B1 * 6/2003 Takabayashi ............... 345/102

* cited by examiner

*Primary Examiner*—Regina Liang
*Assistant Examiner*—Duc Q. Dinh
(74) *Attorney, Agent, or Firm*—McKenna Long & Aldridge LLP

(57) ABSTRACT

This invention relates to a method of driving a liquid crystal display that is adaptive for displaying pixel color with high brightness in a liquid crystal cell. The method of driving a liquid crystal display having a color filter and a back light, includes arranging in turn two color filters which have spectrums different from each other, and arranging two back lights which have spectrums different from each other. In the method, by lengthening the time during which a back light can be turned on when driving a liquid crystal display, transmissivity of light is increased so that the color of a liquid crystal cell can be displayed in high brightness.

14 Claims, 5 Drawing Sheets

METHOD OF DRIVING LIQUID CRYSTAL DISPLAY

This application claims the benefit of Korean Patent Application No. P20007-6845, filed Dec. 15, 2000, which is hereby incorporated by reference in its entirety as if fully set forth herein.

BACKGROUND OF THE INVENTION

1. Field of the Invention

This invention relates to a method of driving a liquid crystal display, and more particularly to a method of driving a liquid crystal display that is adaptive for displaying pixel color with increased brightness in a liquid crystal cell.

2. Description of the Related Art

Generally, an active matrix liquid crystal display (LCD) uses a thin film transistor (TFT) as a switching device to display a moving picture. Since the LCD is able to provide a product having a smaller dimension than a Brown tube or cathode Ray Tube, it has been widely used in various applications of personal computers, notebook computers, office automation equipment such copy machines, etc., and portable equipment such as a cellular phones, pagers, etc.

A liquid crystal display device includes a liquid crystal layer capable of rotating the polarizing direction of light by applying an electric field. Such LCD device includes a common electrode, which is a transparent conduction film formed on an entire glass substrate for applying a voltage to the liquid crystal layer; a thin film transistor (TFT), substrate electrodes composed of a plurality of pixel electrodes; and a plurality of TFTs connected to one another. The liquid crystal display device further includes each TFT device in which each transistor resides between a gate line and a signal line of a TFT substrate and is connected to a gate pad and a data pad to control a voltage for controlling the polarizing characteristics of light passing the liquid crystal layer; a light source; and an optical system making the light incident to the TFT substrate uniform in direction; a straight polarizer which resides between the light source and the TFT substrate; an analyzer attached to the common electrode substrate; and various color filters which are combined with each pixel electrode between a polarizer and a pixel electrode to display one basic color.

In such a liquid crystal display, a color filter composed of pixels of the three primary colors (red, green, and blue) is used between a polarizer and a pixel electrode for displaying the hue. R, G, and B color filters are placed closely together, and a signal of a corresponding color is applied to each color filter to control a luminosity of the expressed color.

FIG. 1 represents color filter characteristics when white light is irradiated to the conventional R, G, and B color filter. As shown in FIG. 1, the color is conventionally expressed using the color filter that has a spatial period (d) of a color, wherein the spatial period has a value not larger than at least a spatial recognition value of a naked eye and the difference of a resolution is one pixel size.

Also, a color field sequential method is a known method by which to obtain a good picture quality without using a color filter, as shown in FIG. 2.

Referring to FIG. 2, there is illustrated the color field sequential method which divides a display area. By eliminating a color filter on a panel, transmissivity of light is increased and a color of light is expressed during a time period, wherein the time period has a time value not larger than at least a time recognition value of a naked eye, and wherein the expressed color has a high spatial resolution.

To describe in detail, when dividing a single frame on the panel into three frames (a red frame, green frame, and a blue frame) and irradiating a back light for each frame for a duration of time during which the back light can be turned on, the time is calculated by subtracting a total data writing time Td and a liquid crystal response time Tlc. In this way, the back light has an increased brightness over a back light composed of one frame because each color is emitted during a time calculated by subtracting the total data writing time and a liquid crystal response time. Generally, when assuming that an entire frame time is the same, it is expressed as in the following formula 1.

$$Tt=3Td+3Tlc+Tbl=3Tw+Tbl \quad \text{Formula 1:}$$

Herein, Tt represents an entire frame time, Td represents a time for writing data on an entire screen, Tlc represents the response time of a liquid crystal, Tbl represents a time during which a back light can be turned on, and Tw represents picture formation time, which is the sum of the response time of the liquid crystal and the time for writing data on the entire screen.

Generally, a liquid crystal display has 60 HZ frame ratio such that Tt=16.7 msec. Referring to the formula 1, the time during which the back light can be turned on is expressed as Tbl=Tt−3Tw. Due to this, the time during which the back light can be turned on is the time calculated by subtracting a value, which is the sum of the time, Td, for writing data and the liquid crystal response time, Tlc, multiplied by '3' (the number of frames in the color field sequential method), from the entire frame time 16.7 msec.

The time, Td, for writing data, the sum, Tw, of the liquid crystal response time Tlc, and the number of frames are factors that affect the time during which the back light can be turned on. No significant increase in brightness is gained over what can be achieved conventionally because a limit is reached in trying to decrease the time, Td, for writing data when driving a liquid crystal display. Furthermore, the time, Tbl, during which the back light can be turned on, is reduced if the liquid crystal response time is increased so that the response time of the liquid crystal or the brightness of the liquid crystal display become inadequate.

SUMMARY OF THE INVENTION

Accordingly, the present invention is directed to a method of driving a liquid crystal display that substantially obviates one or more of the problems due to the limitations and disadvantages of the related art.

Accordingly, it is an advantage of the present invention to provide a method of driving a liquid crystal display for increasing brightness thereof.

In order to achieve these and other advantages of the invention, a method of driving a liquid crystal display device according to the present invention includes the steps of arranging two color filters having spectrums different from each other; arranging two back lights having spectrums different from each other; and turning on and off, in turn, said two back lights to realize full color of a picture with only two frames.

In another aspect of the present invention, said step of turning on and off, in turn, said two back lights to realize full color of a picture with only two frames includes realizing color by mixing spatially for two colors; and realizing color through mixing by time for a remained color.

In another aspect of the present invention, of said two color filters, a first color filter is a color filter of 2 colors which has a light of red and blue (R+B), and a second color filter is a color filter of 2 colors which has a light of green and blue (G+B).

In another aspect of the present invention, of said two frames, a first frame has a back light of two colors with a light of red and green (R+G), and a second frame has a back light of blue.

In another aspect of the present invention, an area of said frame having said back light of blue has less driving time than an area of said frame having said back light of two colors with a light of red and green (R+G).

In the method, a data writing time is reduced by using two blue pixels as a unit in said frame having said back light of blue.

It is to be understood that both the foregoing general description and the following detailed description are exemplary and are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to the principles of the present invention, an example of which is illustrated in the accompanying drawings.

The principles of the present invention are explained with reference to FIGS. 3 to 7.

Figure 1:
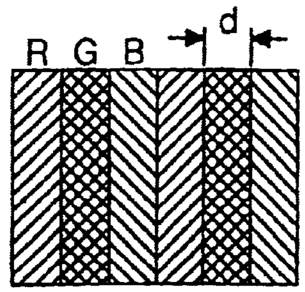
FIG.1 CONVENTIONAL ART
FIG. 1 is a diagram illustrating color filter characteristics according to a conventional method of driving a liquid crystal display.
Figure 2:
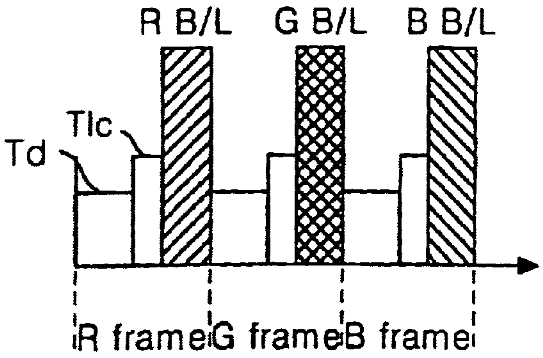
FIG.2 CONVENTIONAL ART
FIG. 2 is a diagram illustrating time characteristics of a color field sequential method in a conventional method of driving a liquid crystal display.
Figure 3:
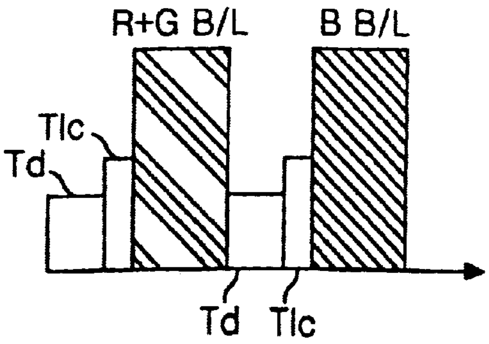
FIG. 3 is a diagram illustrating time characteristics in a method of driving a liquid crystal display of this invention.

FIG. 3 represents time characteristics of a method of driving a liquid crystal display according to the present invention.

Referring to FIG. 3, in the present invention, a frame consisting of two back lights consists of a frame where a red and green (R+G) back light is turned on and a frame where a blue back light is turned on. Because a screen consists of two frames, the time during which each back light is turned on in a frame becomes longer than if three back lights were being used. To describe in more detail, formula 1, has been changed such that $Tt=2Tw'+Tbl'$. Herein, '2' represents the number of the frames used in present invention. If the data writing time, Td, and the liquid crystal response time, Tlc, are equal (that is, $Tw'=Tw$), the time available for each of the back lights increases from $Tbl=Tt-3Tw$ to $Tbl'=Tt-2Tw$. Consequently, for a predetermined image, the time during which the back light within a frame is turned on can be increased such that a higher transmissivity is obtained and the brightness is increased.

Figure 4A:
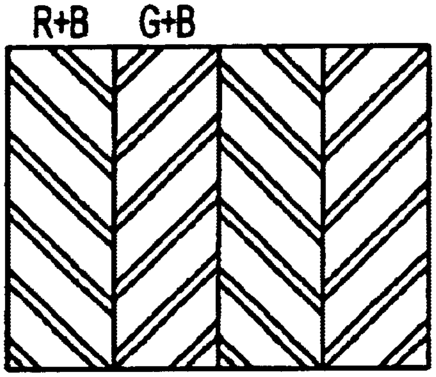
FIGS. 4A and 4B represents a color filter and a back light in a method of driving a liquid crystal display of this invention.
Figure 4B:
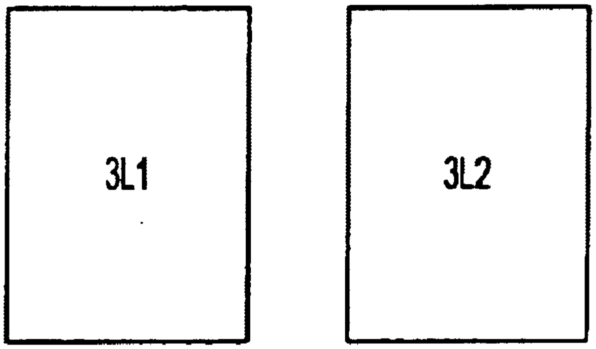

FIGS. 4A and 4B represents a color filter and a back light in a method of driving a liquid crystal display according to the present invention.

Referring to FIG. 4A, this invention, individual color filters having two different spectrums, one color filter having red and blue (R+B) spectrums and another color filter of green and blue (G+B) spectrums are arranged in turn. By filling the available space using two color filters instead of three color filters, a greater amount of the spectrum can be sent to the liquid crystal display. In other words, the transmissivity and brightness of the color filter of the present invention can be 1.5 times higher than the transmissivity and brightness found the conventional color filter. Referring to FIG. 4B, first and second back lights BL1 and BL2 may irradiate light to the color filters described above. In one aspect of the present invention, the first back light BL1 may irradiate light having red (R) and green (G) colors. In another aspect of the present invention, the second back light may irradiate light having blue (B) color.

Figure 5:
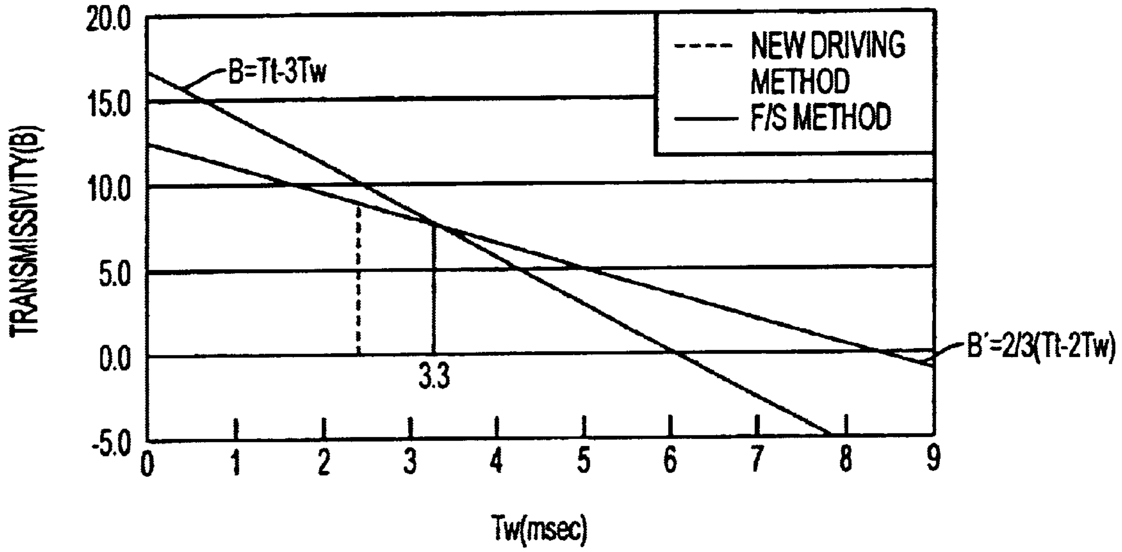
FIG. 5 is a comparison diagram of a transmissivity according to a picture formation time Tw in a method of driving a liquid crystal display.

FIG. 5 illustrates a comparison diagram of transmissivity according to the picture formation time, Tw, in a method of driving a liquid crystal display of this invention.

Referring to FIG. 5, a comparison of the transmissivity in accordance with the picture formation time, Tw, in a driving method according to this invention and a color field sequential method (F/S) is shown. In the color field sequential method, the transmissivity (B) is proportional to the time during which the back light can be turned on, such that $B \alpha Tt-3Tw$, because there is no color filter in the color field sequential method. In the driving method according to the present invention, the transmissivity (B') is proportional to ⅔ of the time during which the back light can be turned on, such that $B'\alpha\frac{2}{3}(Tt-2Tw)$, because the color filter absorbs light of R or G. Consequently, when a full screen formation time Tw is not less than 3.3 msec, a high brightness is obtained due to much higher transmissivity.

FIGS. 6A to 6D illustrate a light spectrum transmitted to the color filter when the back light shown in FIG. 4 is turned on, in a method of driving a liquid crystal display according to the present invention.

Figure 6A:
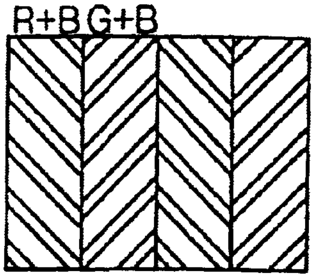
FIG. 6A is a diagram illustrating transmitted light characteristics of a color filter with two colors in a color filter method illustrated in FIG. 5.

FIG. 6A shows the characteristics of the transmitted light when irradiating a white light, as a back light, instead of the three primary colors to the color filter, as shown in FIG. 4. Herein, red and blue (R+B) and green and blue (G+B) are transmitted through the color filter to display the red and blue and green and blue hues.

Figure 6B:
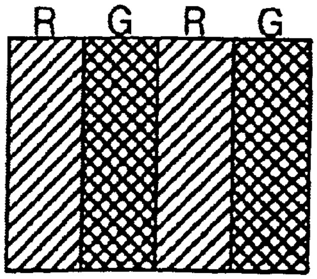
FIG. 6B is a diagram illustrating transmitted light characteristics of a color filter with two colors in a red and green (R+G) frame in a color filter method illustrated in FIG. 5.

FIG. 6B shows the characteristics of the light transmitted to the color filter when irradiating a back light of red and green (R+G), and the color filter only transmits the color emitted from the back light. Herein, red and green are transmitted through the color filter to display the red and green hue.

Figure 6C:
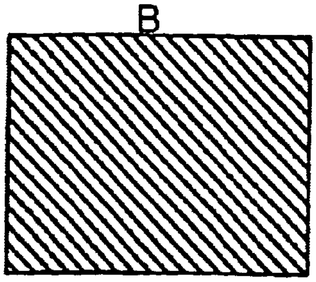
FIG. 6C is a diagram illustrating transmitted light characteristics of a color filter with two color in a blue (B) frame in a color filter method illustrated in FIG. 5.

FIG. 6C shows the characteristics of the light transmitted to the color filter when irradiating a back light of blue, and the color filter only transmits the color emitted from the back light. Herein, only blue is transmitted through the color filter to display the blue hue.

Figure 6D:
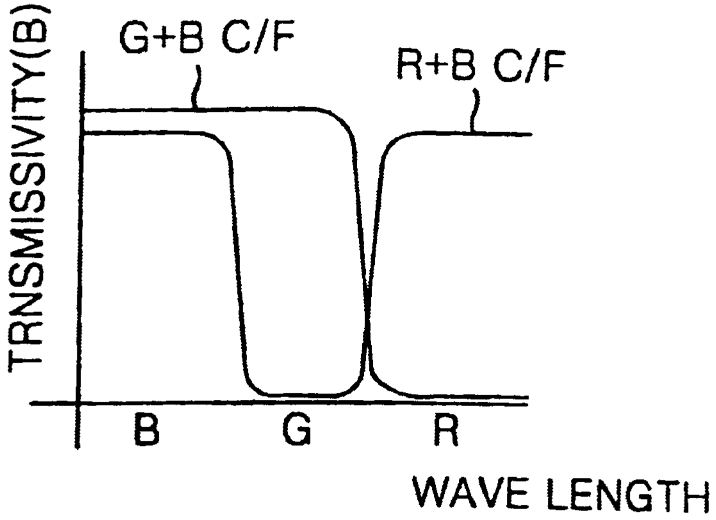
FIG. 6D is a diagram illustrating transmission spectrum of a color filter with two color in a color filter method illustrated in FIG. 5.

FIG. 6D illustrates a graph pf transmissivity when irradiating light of red, green, and blue to a color filter of red and blue (R+B) and a color filter of green and blue (G+B). Herein, the transmissivity of light excluding the colors which are included in the color filters, is zero '0'.

Figure 7:
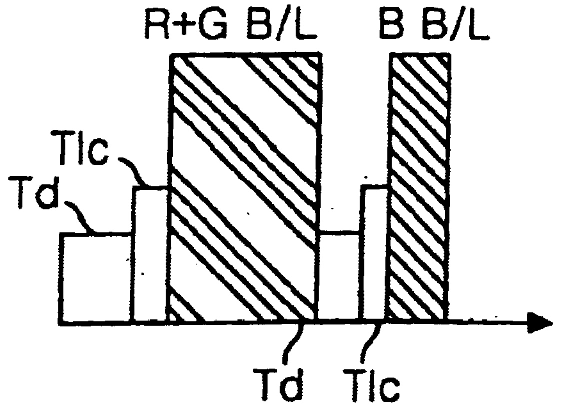
FIG. 7 is a diagram illustrating color characteristics of a method of driving a liquid crystal display according to a first embodiment of this invention.

FIG. 7 shows a time characteristics diagram of a method of driving a liquid crystal display according to another embodiment of the present invention.

Referring to FIG. 7, the time characteristics diagram shows that each driving time is composed of two frames being driven differently than in the frame configuration shown in FIG. 3. Research indicating that the picture quality is most by the influenced by the red and green in the liquid crystal display, the area of a blue frame is reduced so that the effect of blue can be small. Further, because data is inputted using two blue pixels as a unit, the time for writing data in an input display device is reduced. Thereby, the time during which the back light can be turned on is remarkably increased.

As described above, a method of driving a liquid crystal display according to the present invention reduces the time required to write data within the same frame to increase the amount of time during which the back light is turned on. Accordingly, by increasing the time during which the back light is turned on in the liquid crystal display, the transmissivity of light is increased so that the light can be displayed with high brightness when expressing the color of a liquid crystal cell.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of driving a liquid crystal display comprising:

arranging two color filters which have spectrums different from each other;

arranging two back lights which have spectrums different from each other; and irradiating light to the two color filters by sequentially turning the two back lights on and off, wherein a full color picture is realized with only two frames.

2. The method according to claim 1, wherein sequentially turning the two back lights on and off includes:

realizing color by mixing spatially for two colors; and realizing color through mixing by time for a third color.

3. The method according to claim 1, wherein said two color filters comprise a first color filter capable of transmitting red and blue (R+B) light, and a second color filter capable of transmitting green and blue (G+B) light.

4. The method according to claim 1, wherein said two frames comprise a first frame wherein light is emitted by a back light capable of emitting red and green (R+G) light, and a second frame wherein light is emitted by a back light capable of emitting blue light.

5. The method according to claim 4, wherein a driving time of said second frame is less than a driving time of said first frame.

6. The method according to claim 5, wherein a data writing time is reduced using two blue pixels as a unit in said second frame.

7. A liquid crystal display comprising:

two color filters having spectrums different from each other, wherein said color filters are each capable of transmitting two colors; and two back lights having spectrums different from each other, wherein a full color picture is realized using only said two back lights.

8. The liquid crystal display according to claim 7, wherein said two color filters consist of a first color filter and a second color filter.

9. The liquid crystal display according to claim 8, wherein said first color filter is a red and blue (R+B) color filter and said second color filter is a green and blue (G+B) color filter.

10. The liquid crystal display according to claim 7, wherein said two back lights consist of a first back light and a second back light.

11. The liquid crystal display according to claim 10, wherein said first back light emits two colors and wherein said second back light emits one color.

12. The liquid crystal display according to claim 10, wherein said first back light emits red and green (R+G) light and wherein said second back light emits blue (B) light.

13. The liquid crystal display according to claim 12, wherein the second back light is driven less during a frame than said first back light.

14. The liquid crystal display according to claim 13, wherein said two color filters transmit blue light upon driving the second back light.

* * * * *